United States Patent [19]
Takats

[11] Patent Number: 5,237,659
[45] Date of Patent: Aug. 17, 1993

[54] GATEWAY DEVICE FOR CONNECTING A COMPUTER BUS TO A RING NETWORK

[75] Inventor: Gilbert Takats, Le Mesnis Saint Denis, France

[73] Assignee: Bull S.A., Paris, France

[21] Appl. No.: 877,254

[22] Filed: Apr. 28, 1992

Related U.S. Application Data

[63] Continuation of Ser. No. 557,519, Jul. 24, 1990, abandoned.

[30] Foreign Application Priority Data

Jul. 27, 1989 [FR] France .................. 89 10156

[51] Int. Cl.$^5$ .............................................. G06F 13/00
[52] U.S. Cl. .................................. 395/200; 370/85.4; 370/85.5; 395/275
[58] Field of Search ................... 370/85.4, 85.5; 364/DIG. 1, DIG. 2; 395/200, 275, 325

[56] References Cited

U.S. PATENT DOCUMENTS

| | | | |
|---|---|---|---|
| 4,646,232 | 2/1987 | Chang et al. | 364/200 |
| 4,663,706 | 5/1987 | Allen et al. | 395/250 |
| 4,771,391 | 9/1988 | Blasbalg | 364/200 |
| 4,835,674 | 5/1989 | Collins et al. | 364/200 |
| 4,845,609 | 7/1989 | Lighthart et al. | 364/200 |
| 4,866,421 | 9/1989 | Szczepanek | 340/825.52 |
| 4,922,503 | 5/1990 | Leone | 370/85.13 |

FOREIGN PATENT DOCUMENTS 0193305 9/1986 European Pat. Off. .
WO84/0319-12 8/1984 World Int. Prop. O. .

OTHER PUBLICATIONS

"Five-Chip Set Eases Design of 100M-bps, Fiber-Optic Local-Area Networks", E.D.N.-Electrical Design News, vol. 32, No, 22, Oct. 29, 1987, pp. 132, 134.

*Primary Examiner*—Robert L. Richardson
*Attorney, Agent, or Firm*—Weingarten, Schurgin, Gagnebin & Hayes

[57] ABSTRACT

A gateway device for connecting a computer bus to a high-speed fiber optic ring network including an I/O host module of the computer connected to the computer bus and having at least one external communication bus for carrying both data and control blocks containing parameters relative to the composition of data frames. The gateway device also includes an adapter device physically connected to the network, and an interface which ensures transfer of the data and control blocks between the I/O host module and the adapter device. The adapter device includes a memory for storing the data frames before they are transmitted to the network and after they are received from the network, and a transfer management controller for managing the transfer of data frames between the I/O host module and the network. The controller includes a control bus which carries the control blocks and the control characters of the data frames. The adapter device further includes a high-speed bus which transports the data. The transfer interface is connected to the communication bus as well as to the high-speed bus and the control bus.

8 Claims, 6 Drawing Sheets

GATEWAY DEVICE FOR CONNECTING A COMPUTER BUS TO A RING NETWORK

This application is a continuation of application Ser. NO. 07/557,519, filed Jul. 24, 1990, now abandoned.

FIELD OF THE INVENTION

The present invention relates to computer systems and more particularly, to a gateway device for connecting a computer bus to a fiber optic data transmission token-ring network.

BACKGROUND OF THE INVENTION

Data transmission networks are composed of a number of units, generally called "data terminal equipment" (DTE), or simply terminals or stations. These terminals or stations can be composed of computers. The terminals communicate with one another through a transmission system. Token ring networks are among the data transmission networks in widest use at the present time.

Recent technological developments in the transmission systems area are leading to increasingly frequent use of fiber optics to transport data in a transmission network from one terminal to another. Thus, loop networks are formed whose transmission medium is composed of optical fibers. Such networks include the Fiber Distributed Data Interface (FDDI) network as defined by the international standardization committees such as Committee X3T9-5 of ANSI (American National Standard Institute). The standards defined in these ANSI documents are about to be adopted by the ISO, the International Standards Organization.

These standards define, for example, the maximum total length of the fiber in the network at 200 km, the maximum distance between the stations furthest apart in the network at 100 km, the maximum distance between stations (2 km) and the maximum number of physical connections, 1,000. They also define the speed and off-line "flow", the format of the frames which must not include more than 4500 octets or bytes (8-bits long) of information, the nature of the signals constituting the control characters placed at the beginning and end of the frame, and the length of each of the groups of signals depending on their nature, as well as the code in which the information is written and transmitted from one station to another.

One of the many advantages of using optical fibers as the medium for transmission of information on a network is the high level of throughput obtained which can be on the order of 100 Mbit/s.

In order for a terminal to be able to transmit information on a token ring network (also known as a loop network), the token access method to the loop is used. A synchronous transmission is established in the loop network with resynchronization taking place as the token passes each terminal. Thus all the terminals are monitor terminals.

When no terminal has any data to send, a token circulates in the loop. To send data, a terminal intercepts the first token which it receives then sends in its place, in the form of a data frame, all or part of the data which it has to send. It then sends another token into the loop.

Accidental loss of the token can result from transmission errors or reconfiguration of the loop. To reestablish the circulation of a token in case of loss or following the initial start-up of the network, a monitor terminal continuously monitors whether another terminal is transmitting, or whether a token is circulating in the loop. If neither event occurs for a certain period of time, the monitor terminal reestablishes the initial state of the loop by emitting a token followed by filler signals which can be distinguished from the token.

Accidental duplication of the token can also take place as a result of transmission errors. In this case, return to normal is also easily achieved. Since the frames transmitted by any given terminal have at the head of the frame the terminal address, a given terminal can recognize on reception the frames which it itself transmitted.

After having intercepted the token to transmit its data, a terminal resends a token immediately after sending its last frame. If after a certain period of time, which is one of the network parameters, this beginning of the frame has still not been received, the terminal returns to a transparent state without resending a token. Subsequently, the monitor terminal detects the loss of a circulating token and re-establishes the circulation of the token as outlined above. The frame is the elementary block of information, transmitted by any station or terminal, which travels on the transmission network. The frame includes a start of frame delimiter, an end of frame delimiter, frame control characters the address of the station for which the message is destined (Destination address), the address of the sending station, the length of the data (Source address), and finally the useful data itself. More simply, a frame is composed of useful data which is bracketed in time by signals located at the head of the frame and by signals placed at the end of the frame. The signals placed at the head and at the end of the frame which bracket the useful data are called control characters.

It is known that a computer is composed of a central processing unit, or CPU, and various peripherals which can be magnetic peripherals such as disk drives or other peripherals called input/output (I/O) devices which allow for exchanging data (Cathode Ray Tubes (CRTs), printers, etc.).

The CPU is composed of at least one processor and a main memory to which this processor is connected, and an I/O processor which monitors the exchange of data between the memory and the various peripherals. The set of functional component elements that make up the computer such as the central processor or the I/O processors, random access memory and read only memory, I/O controllers or peripheral controllers, are all accommodated on a group of boards whose dimensions are generally standardized. Each board is composed of a printed circuit on which a plurality of integrated circuits is mounted. These boards are generally connected to one parallel bus which provides communication between the different processors, transport of data between the different boards, and electrical power for them. Among the buses which are in most frequent use at the present time is the bus called MULTIBUS ® II (registered trademark of the Intel Company).

As its name indicates, the architecture of a MULTIBUS ® II is structured about a main bus of the parallel type and secondary buses. Only the main bus is standardized according to Institute of Electrical and Electronic Engineers. Inc. (IEEE) Standard 1296. This bus is called the parallel system bus or PSB. When a computer is used as a network station, it is connected to it by an interface composed of a special board called a host card or an I/O host module. According to IEEE Standard 1296, the host card is connected to the PSB bus by a coprocessor such as a VL 82c 389 type (made by Intel) which communicates in the message mode with the other functional component elements of the computer and which communicate with one another through the PSB. Data transfer to the network is managed by a microprocessor on the host card with the data to be transmitted on the network being routed through the internal communication bus of the microprocessor. It is clear however, that the data transmission modes on the PSB bus and the internal communication bus of the host card microprocessor on the one hand, and on the FDDI network on the other are completely different in terms of the data transmission rate, the transmission protocols used, the write codes, the format of the control characters, and the format of the information itself. For example, transmission of information occurs in parallel on the internal communication bus of the host card microprocessor and in series on the FDDI network.

It is therefore necessary to adapt the data transmission on the internal communication bus of the host card to the transmission conditions on the network.

SUMMARY OF THE INVENTION

The specific goal of the present invention is to accomplish this adaptation. It makes it possible to connect or provide a link between the PSB bus to the high-speed FDDI network. The gateway device according to the invention is sufficiently fast and simple to be adaptable to any type of host card regardless of the manufacturer. It therefore constitutes a universal gateway device which is simple, has good performance, is economical, and is compact, making it possible to transmit information to or from the network at the fastest possible speed compatible with the extremely high speed of the ring network.

According to the invention, the gateway device for connecting a computer bus to an optical fiber ring network of the FDDI type includes an I/O host module for connecting to a computer bus and containing at least one external communication bus, for carrying both the data and the FDDI frame control blocks as well as for carrying the nature of the operations to be carried out by the gateway device. Transmission to or from the network by the computer bus are controlled by a first microprocessor on the I/O host module. Also included is an adapter device physically connected to the network, having an interface for ensuring transfer of data and control blocks between the I/0 host module and the adapter device.

The interface includes storage memory to store the FDDI frames before they are transmitted to the network and after they are received from the network, and a controller for managing the transfer of frames between the host module and the network. The controller includes a control bus that carries the control blocks coming to or from the host module and the control characters of the FDDI frames coming to or from the storage memory. The controller interprets the control blocks to form the control characters and forms the control blocks from the control characters.

The interface also includes a high-speed bus that carries the data coming to or from the interface, the storage memory and the network, with the transfer interface being connected both to the communication bus of the I/O host module and to the high-speed bus and the control bus, with the transfer of data and the control blocks on the latter two buses being carried out independently of each other.

BRIEF DESCRIPTION OF THE DRAWINGS

Other features and advantages of the present invention will be apparent from the following description and the attached drawings in which:

FIGS. 2 and 3 show the various essential component elements of the gateway device according to the present invention, with FIG. 2 more specifically showing the I/O host module as well as the transfer interface, while

DETAILED DESCRIPTION OF THE INVENTION

Figure 1A:
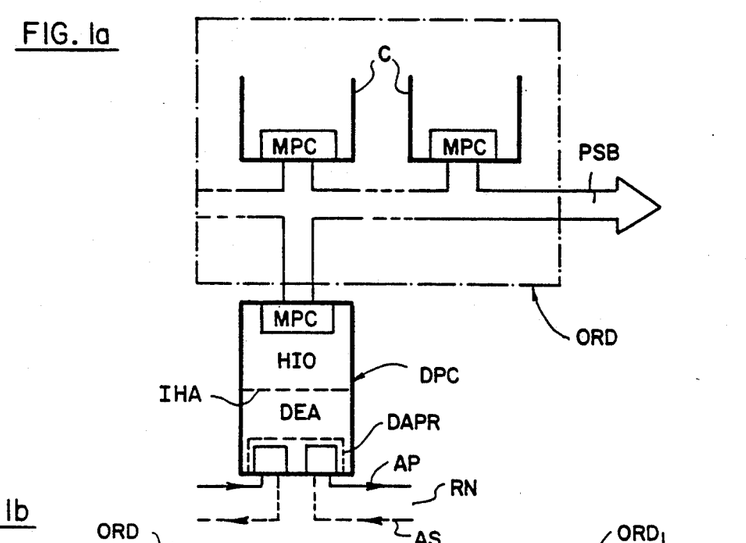
FIGS. 1A and 1B show how a computer, considered as a network terminal, connected to an optical fiber network through a gateway device according to the present invention.

FIG. 1A shows a computer ORD whose various component elements are disposed on a plurality of boards C communicating with one another through a parallel system bus PSB of the MULTIBUS ® II type. Each of boards C is connected to the PSB bus through a coprocessor MPC manufactured, for example, by the Intel Company. Transfer of information from the boards to the MULTIBUS ® II is accomplished by a system known as the message mode. The communication mode between the various boards in computer ORD, by message mode emitted by the MPC coprocessors, is defined in IEEE Standard 1296. Computer ORD is connected to a ring network RN, by the intermediary of a gateway device DPC according to the present invention. Network RN uses optical fibers as a transmission medium, and is composed, for example, of a main ring AP and a secondary ring AS.

The gateway device DPC according to the present invention consists of both an I/O host module HIO, an adapter device DEA, and an interface IHA which ensures transfer of information between host module HIO and adapter device DEA.

Host module HIO is connected to bus PSB by a coprocessor MPC of the same type as the coprocessors on boards C of computer ORD. Host module HIO and coprocessor MPC are mounted on a board whose physical design is similar to that of boards C.

The connecting gateway device DPC is physically connected to the RN network by a device providing physical access to the network, namely DAPR, which is part of adapter device DEA.

Figure 1B:
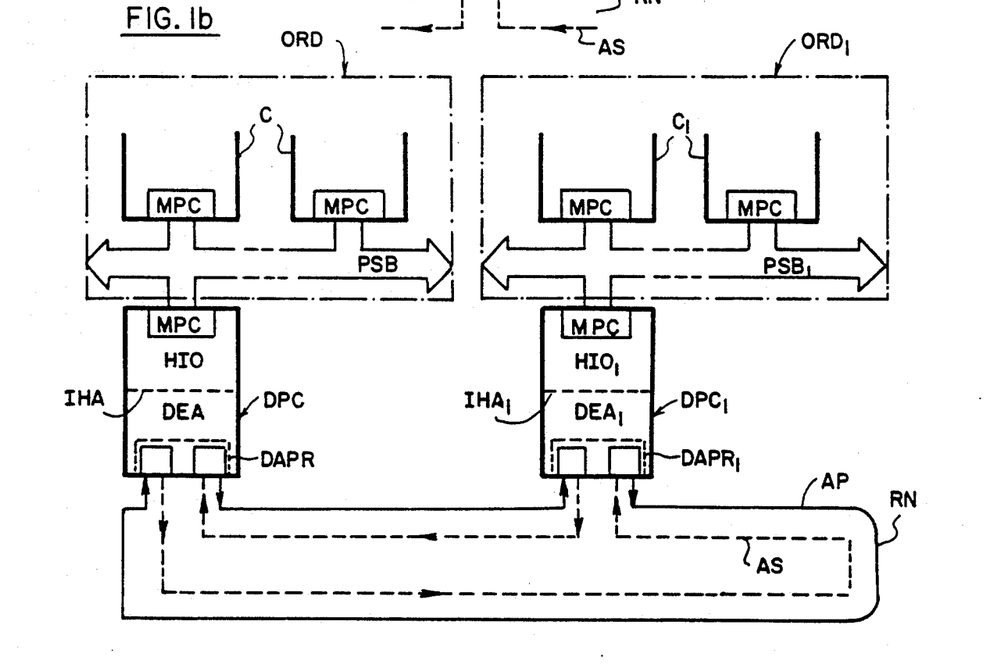

FIG. 1B shows an example of a network RN in the form of a ring to which are connected a first computer $ORD_1$ by means of gateway device DPC, and a second computer $ORD_1$ connected by means of gateway device $DPC_1$. Computer $ORD_1$ may have a structure similar to that of computer ORD and is consequently composed of a plurality of boards $C_1$ connected together to bus $PSB_1$ of the MULTIBUS® II type by coprocessors MPC. Gateway device $DPC_1$ has a structure identical to that of device DPC and is therefore composed of a host module $HIO_1$, an adapter device $DEA_1$ and a transfer interface $IHA_1$. Host module $HIO_1$ is connected to bus $PSB_1$ by a coprocessor MPC while adapter device $DEA_1$ is physically connected to network RN by a device $DAPR_1$ for physical access to the network RN.

Figure 2:
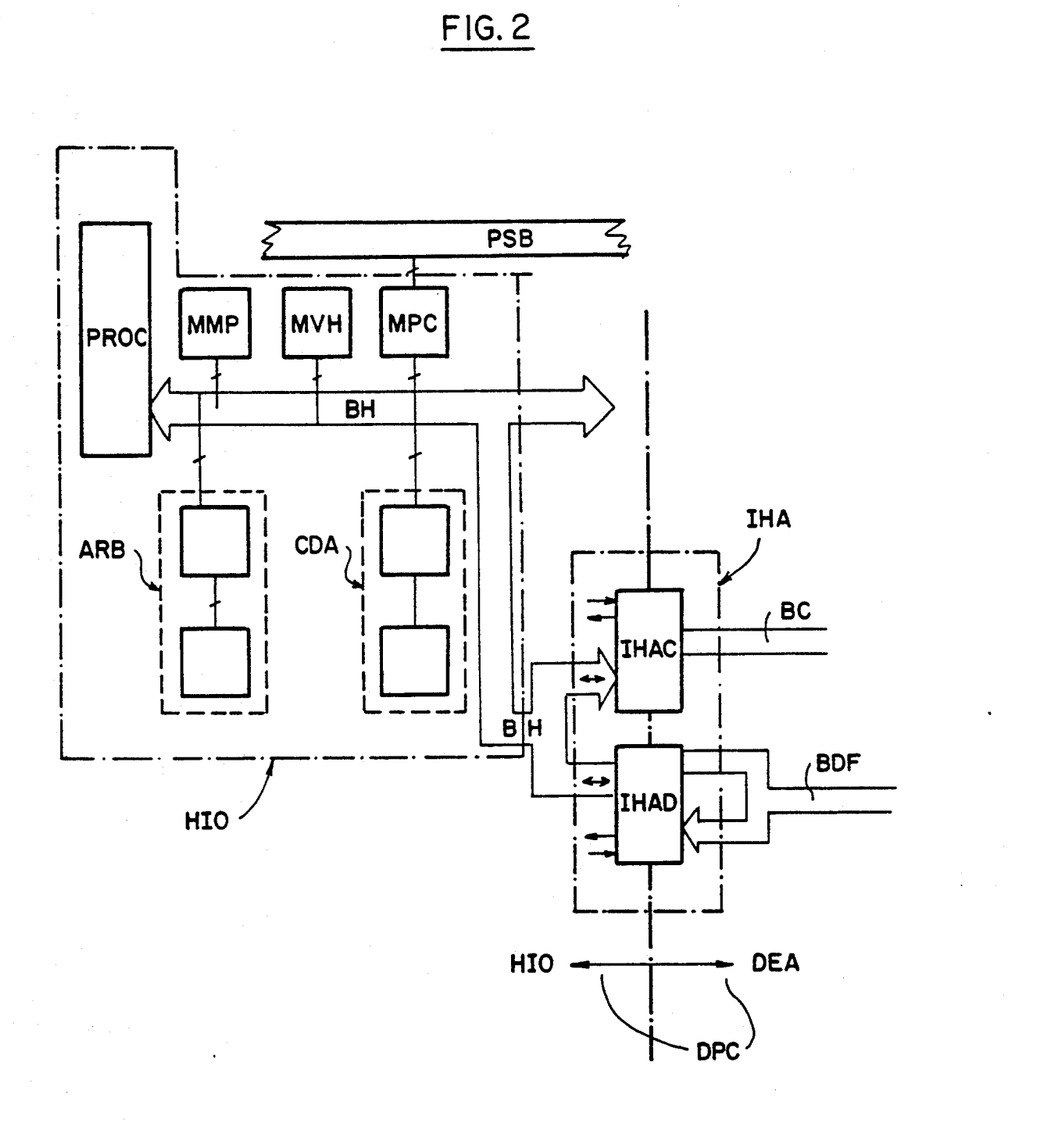
Figure 3:
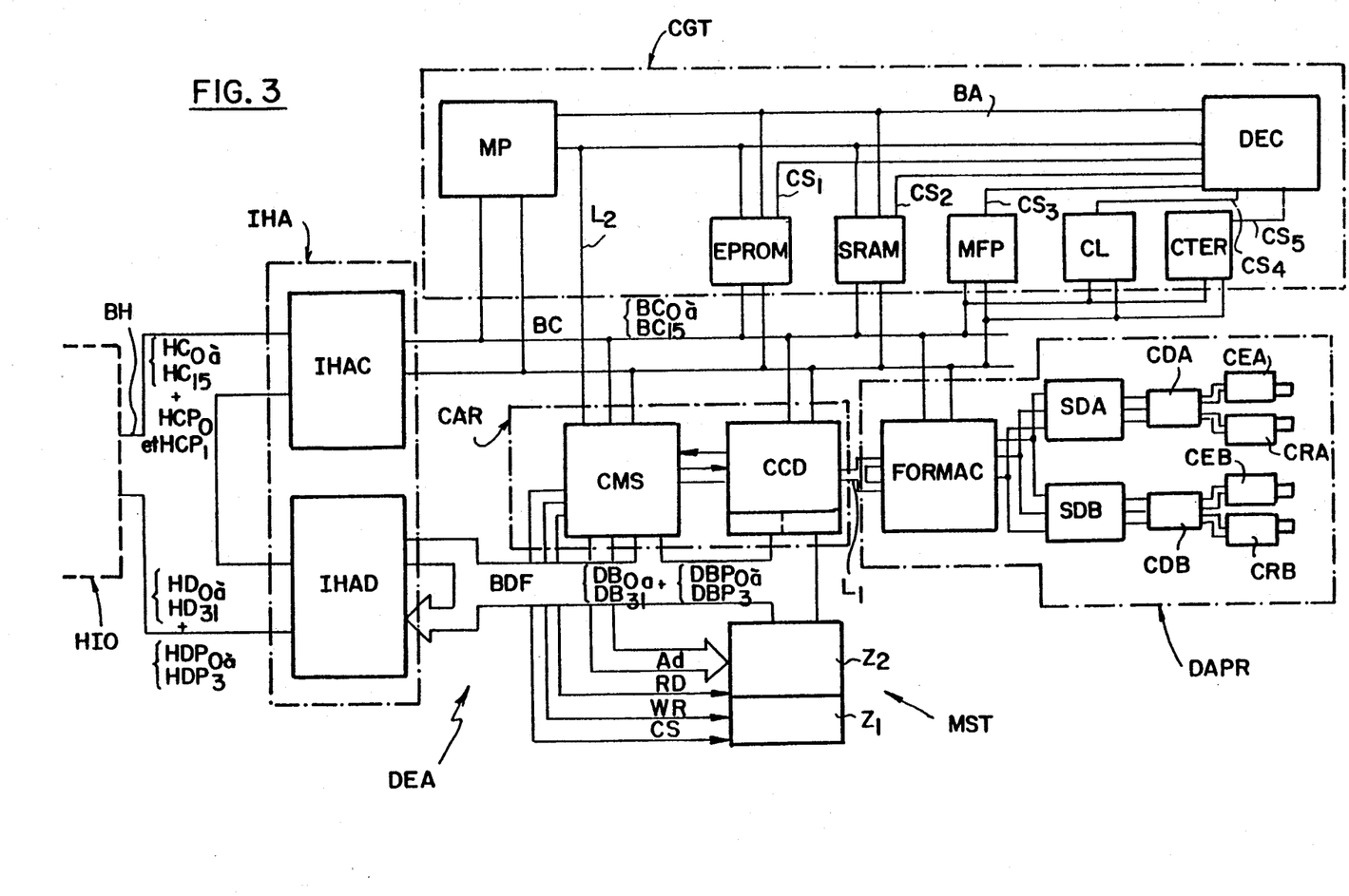
FIG. 3 shows other elements of the gateway device.

The various essential component elements of the connecting gateway device DPC according to the present invention are shown in greater detail in FIGS. 2 and 3. These include host module HIO, FIG. 2, designed around a microprocessor PROC of the 68020 type made by the Motorola Company and a bus BH associated with this microprocessor. Transfer interface IHA is connected to host module HIO by bus BH. This transfer interface is composed of an interface IHAD which allows data to be transferred to or from host module HIO and a control block transfer interface, IHAC, which allows transferring control blocks to or from host module HIO.

Adapter device DEA, FIG. 3, includes transfer management controller CGT, access controller CAR, bus BDF, memory MST, and device DAPR. Controller CGT provides transfer management and is designed around a microprocessor MP such as a 68010 manufactured by the Motorola Company, and includes a control bus BC. Bus BC is connected to the output of control interface IHAC of transfer interface IHA.

Bus BDF transfers the data at high speed (on the order of 200 Mbit/s) to or from data interface IHAD of transfer interface IHA. Controller CAR provides access to the network RN, and is connected to the high-speed data bus BDF and the network physical access device DAPR. Memory MST is provided to store the FDDI frames that have been transmitted and received from the network RN or the computer ORD. Memory MST is also connected to high-speed bus BDF and to access controller CAR.

The operation of connecting gateway device DPC according to the present invention proceeds as follows. Assuming that we are trying to send information from computer ORD to network RN via bus PSB, the information transmitted by coprocessor MPC is first stored in memory, then analyzed by microprocessor PROC which then generates a control block SCB containing parameters relative to the makeup of the frames which enter network RN, along with the nature of the operations to be carried out by adapter device DEA under the control of its management controller CGT.

The parameters relating to the constitution of the FDDI frames include, for example, the address of the station for which the information is destined, the address of the sender, and the length of the messages sent.

As soon as microprocessor PROC has formulated control block SCB, it sends the control block, as well as the corresponding data on bus BH to interface IHA. Control block SCB is routed by bus BH to control interface IHAC. In a preferred embodiment of the invention, control block SCB is routed to control interface IHAC as 16 bits, namely $HC_0$ to $HC_{15}$ accompanied by two parity bits $HCP_0$ and $HCP_1$. The data is routed on 32 bits, namely $HD_0$ to $HD_{31}$, accompanied by four parity bits $HDP_0$ to $HDP_3$. These data bits are sent to the data interface IHAD of transfer interface IHA.

Both the data and control block SCB are provisionally stored in their respective interfaces IHAD and IHAC before being transferred to buses BC and BDF.

It is important to note that control block SCB can be transferred to bus BC before, at the same time as, or after the data has been transferred to bus BDF. Thus the transfer of the control blocks and the data to the two separate buses BC and BDF takes place independently of each other. There is said to be parallelism of transfer of control and data blocks.

When network access controller CAR gives its authorization, the data is transferred from interface IHA to memory MST where it is stored waiting to be sent to network RN. Data can only be sent to the network if management controller CGT has processed the control characters located at the beginning and end of the FDDI screens. It should be pointed out that a given message transmitted by computer ORD to network RN has a variable length. The management controller determines the number of FDDI frames which it must form in order for this message to be completely sent over the network. According to the above ANSI standard, the length of a single FDDI frame cannot exceed 4500 bytes or octets. It is therefore clear that if the message sent by computer ORD is longer than 4500 bytes, the number of frames corresponding to this message will be greater than or equal to 2.

Control block SCB corresponding to the data transmitted on bus BDF is sent to processor MP by bus BC. The microprocessor analyzes the data contained in this block, interprets it, and decides on the operation to be carried out under the control of controller CGT, determining the number of FDDI frames corresponding to the messages sent by computer ORD. Processor MP then processes the control characters at the beginning and end of the FDDI frames corresponding to the messages given above.

As soon as microprocessor MP has completed its analysis and interpretation of control block SCB, it then sends the control characters through access controller CAR to memory MST where they are stored waiting for access controller CAR to authorize the transfer of frames FDDI to network RN through access device DAPR.

High-speed data bus BDF has three possible accesses, namely; access from access controller CAR (this access is effected by the direct memory access or DMA mode); access from processor MP through access controller CAR by a system of instructions to transmit the control characters processed by the latter to memory MST; and access from the host module through transfer interface IHA using the DMA mode.

Depending on the type of access which is sought, access controller CAR may or may not authorize access to bus BDF, knowing that each of the possible accesses has a different priority, with the highest priority being accorded to the access controller itself (in other words, to the transfer of information from network RN), and the lowest priority is reserved for access to host module HIO. When the FDDI frames stored in memory MST are full, they are then transferred under the control of access controller CAR through device DAPR to network RN. Device DAPR serializes the frames, encodes them, and formats them so that they can be transferred to the network.

Let us now consider the case of the transfer of a message coming from a station other than computer ORD, for example computer $ORD_1$ in FIG. 1b, which is transmitted by network RN. This message arrives at access device DAPR. It is reformatted and decoded by the latter. This message which is transmitted on the RN network in series is deserialized by device DAPR and changed to eight-bit parallel form, before being transmitted to access controller CAR. All of the functions and elements constituting device DAPR are described in the ANSI standard described above.

Access controller CAR transforms the message coming from the access device, from eight bits in parallel, into thirty-two bits in parallel. The reformatted message is then transmitted through bus BDF to storage memory MST.

Microprocessor MP of controller CGT then searches storage memory MST using access controller CAR to find the control characters at the beginning and end of the frame. It analyzes and interprets them and then puts together, as a function of this analysis and this interpretation, a control block SCB which it sends via bus BC to control interface IHAC.

During this period of time the corresponding data in FDDI Frame are extracted from storage memory MST and transmitted by bus BDF under the control of access controller CAR to data interface IHAD. Control block SCB can be transmitted to interface IHAC before, during, or after the data are transmitted by bus BDF to interface IHAD.

Control block SCB and the corresponding data are transmitted respectively by interfaces IHAC and IHAD to microprocessor PROC via bus BH before the microprocessor PROC transmits the data accompanied by the transmission protocol specific to computer ORD and MULTIBUS ® II, to computer ORD via coprocessor MPC and bus PSB.

Interface IHA transmits control block SCB and the data corresponding to transmission and reception so as to render totally asynchronous, host module HIO on the one hand and adapter device DEA on the other hand. Moreover, interface IHA is completely transparent from the standpoint of transmission of information to storage memory MST because its cycle for filling and data transfer to or from it is contained within the filling cycles of storage memory MST.

Now let us look in greater detail at each of the essential constituent elements of the connecting gateway device DPC according to the present invention.

As stated above, host module HIO, FIG. 2, is built around a microprocessor PROC on bus BH and provides an interface between connecting gateway device DPC and bus PSB of the MULTIBUS ® II type of computer ORD. The host module comprises programmable ROM and MMP, RAM, MVH, the coprocessor MPC, the bus arbiter device ARB, and controller CDA for direct memory access to RAM MVH. In the preferred embodiment, microprocessor PROC is a 68020 microprocessor made by Motorola. Its timer frequency can vary between 10 MHz and 20 to 25 MHz. The elements which make up host module HIO form the classical environment of a 68020 type microprocessor.

Programmable ROM MMP contains the program for forming control blocks SCB. This program interprets and analyzes the control characters located at the beginning and end of messages sent by computer ORD to bus PSB, and as a function of this analysis and this interpretation, puts together the information contained in control block SCB which is sent to microprocessor MP of controller CGT via bus BH and control interface IHAC. RAM MVH whose capacity is on the order of several millions of words (between 1 and 4 preferably) can contain all the data sent by computer ORD, before it is transmitted, under the guidance of microprocessor PROC, to data interface IHAD via bus BH. (In the other transmission direction, RAM MVH stores the data coming from the adapter device before sending it to bus PSB).

Controller CDA controls the access in DMA mode to memory MVH. This controller comprises at least two DMA channels, one for transmitting data, and the other for receiving data.

The arbitration device ARB arbitrates access to bus BH. Three possible accesses for this bus are possible: access to RAM MVH in DMA mode, coming from bus PSB via coprocessor MPC, (this access benefits from the highest priority of host module HIO); access for adapter device DEA; and access for microprocessor PROC.

Transfer of information on bus BH, both for control block SCB and for the data, is accomplished in burst mode. It should be pointed out that bus BH can be replaced by two separate buses, one to transfer the control blocks SCB into IHAC, and the other to transfer the data into IHAD.

Device DAPR, FIG. 3, provides physical access to the network and includes a first pair of optoelectronic couplers CEA-CRA for transmitting and receiving, and a second pair of optoelectronic couplers CEB-CRB, also for transmitting and receiving. The first pair provide physical coupling of adapter device DEA to the main ring AP of network RN, while the second pair ensure physical coupling of the adapter device to the secondary ring AS of network RN. Suitable optoelectronic couplers are manufactured, for example, by ATT as part number 1256B for transmission and as part number 1356B for reception.

The coders-decoders CDA and CDB are provided for the main ring and secondary ring AP and AS, while the serializers-deserializers, SDA and SDB, are provided for the main and secondary rings respectively. The two assemblies formed by CDA and SDA and CDB and SDB respectively are identical and are available, for example, from AMD Company as part numbers Am7984A and Am7985A. Device DAPR also includes ring access controller FORMAC manufactured by AMD as part number 79c83.

When receiving data, coupler CEA transmits each FDDI frame to coder-decoder CDA which decodes the information contained in the frame and transmits it, in the code specific to computer ORD, to serializer-deserializer SDA which in turn transmits it to the element FORMAC in parallel, eleven bits wide in the embodiment shown here. Element FORMAC recovers the frame status and transmits it via control bus BC to management controller CGT which analyzes this status and determines if it is or is not an error. In addition, the frame data, as well as the control characters at the beginning (frame control) and end of the frame (frame status), are transmitted in over an eight bit parallel bus to access controller CAR, which in turn sends them over high-speed data bus BDF to storage memory MST.

Each of the elements constituting device DAPR and the function which it performs are described in detail in the above-mentioned ANSI standard.

Transfer management controller CGT is built, as stated above, around microprocessor MP of the 68010 type made by Motorola which has an address bus BA and 16-bit control bus BC, namely $BC_0$ to $BC_{15}$. Preferably, control bus BC is formed by the internal bus of microprocessor MP. Controller CGT also includes programmable read-only memory (ROM EPROM), static memory RAM SRAM, interrupt controller MFP, clock circuit CL, controller CTER which controls the size of the frames for transmission and reception, and decoder DEC which enables microprocessor MP to address each of the elements EPROM, SRAM, MFP, CL, and CTER.

The ROM EPROM, the RAM SRAM, interrupt controller MFP, timer circuit CL, and controller CTER are each connected to control bus BC. In addition, ROM EPROM and RAM SRAM are connected to address bus BA of microprocessor MP (in the embodiment described here, the connection of these two elements to address bus BA is 16 bits wide). In addition, decoder DEC is connected to address bus BA and to elements EPROM, SRAM, MFP, CL, and CTER through the five signal paths $CS_1$ to $CS_5$. Programmable memory EPROM has a capacity of 128k bytes in the embodiment described here, but it can be designed in the form of several modules with its capacity depending on the number of programs desired to be recorded in it. This memory includes the program for forming and interpreting control blocks SCB and forming the FDDI frames. If the messages computer ORD transmits are longer than 4500 bytes, the program contained in the programmable memory cuts the message into several FDDI frames whose length is equal to or less than 4500 bytes.

Programmable memory EPROM also includes all the programs for different operations which adapter device DEA can execute under the control of controller CGT. Among these operations is the transfer of FDDI frames to the network, the transfer of frames from storage memory MST to host module HIO, self-testing of the board that carries the DEA, maintenance, and statistics.

Programming access controller CAR so that it controls access to different sectors of the memory as well as information coming from network RN, from transfer management controller CGT and host module HIO is performed by microprocessor MP. Among the various operations that must be performed also includes statistics on reception and transmission of frames, the number of correct frames, the number of frames with errors, programs for resending frames when one of them is in error, and programs for retransmitting tokens into the RN network when, according to the IEEE Standard cited above, the token is either lost or is taking too much time to circulate in the ring network. In the embodiment described herein, there are twenty-three operations that the adapter device can perform, namely twenty-three programs written in the EPROM memory. Consequently, there are twenty-three possible interrupts for the microprocessor whose task consists mainly of processing each of these interrupts, handling each of them according to one of the twenty-three programs which it must then execute.

Static memory SRAM includes at least one module composed of 64k bytes. Microprocessor MP provides direct access to this memory. It records in it the information contained in the microprocessor registers when the latter is processing an interrupt that takes priority over the program which was being executed when the interrupt occurred. The information which is then contained in the registers of the microprocessor is transferred to the SRAM memory and saved there.

Interrupt controller MFP which is, for example, a controller of the 68901 type made by Motorola makes it possible to assist microprocessor 68010 in processing the twenty-three required interrupts. A type 68010 microprocessor by itself can only handle seven by design. It is obvious that if microprocessor MP is composed of a microprocessor of a more powerful type than the 68010 which could handle more interrupts, an interrupt controller like the MFP could be dispensed with.

The timer circuit in this embodiment includes a group of identical modules of the Am9513 type made by AMD. Three of the modules serve as counters and perform statistics, and thus, it is possible to memorize what takes place on the network, namely to count the number of FDDI frames in circulation, the number of lost frames, and the number of frames with errors. These counters are programmable by microprocessor MP, the programs being those contained in static memory SRAM.

The remaining Am9513 modules which form timer circuit CL perform a timer function, for example to read information cyclically to review the contents of the three above counters regularly over time.

Other functions which the Am9513 modules programmed as timers perform include checking the time it takes the token to go around the ring constituting network RN. This makes it possible to determine whether a token has been lost or whether the stations are holding onto the token too long in which case the microprocessor programs element FORMAC of the physical access device DAPR to issue a new token.

The counter of the size of the frames for transmission and reception CTER counts the number of words in the frames which are circulating on high-speed bus BDF since access controller CAR does not have a counter. As soon as controller CTER has counted all the words of a frame (when the latter has a length equal to 4500 bytes or less, its length being in any case known by processor MP, since the latter cuts the messages into several frames), the data transmission on high-speed bus BDF is interrupted.

During transmission, when the second microprocessor MP receives from the first microprocessor a control block SCB through control interface IHAC, it finds in this block the size (in words) of the screen to be transferred, and then loads the screens into counter CTER. (There are actually two counters, one for transmission and the other for reception). When the corresponding frame data are transferred, access controller CAR (by means of its channel DMA reserved for transmission of data on bus BDF), sends a signal to CTER at each transmission of a word, which causes CTER to count down one unit. When its contents are equal to zero, it sends an interrupt to second microprocessor MP which knows that the transfer is completed and is therefore free for another task.

The same events occur during data reception. The first microprocessor finds a transfer size in control block SCB which it reads in interface IHAC. It then informs second microprocessor MP which then loads the size of the frame to be transferred into counter CTER which counts down one unit each time one word is transferred from memory MST to interface IHAD (under the control of channel DMA corresponding to controller CAR). When the counter contents are equal to zero, it sends an interrupt to microprocessor MP which then knows that the transfer is completed.

Decoder DEC makes it possible to individually address each of the elements which comprise controller CGT, under the control of microprocessor MP. Each time the microprocessor needs to address one of these elements, it sends an address through bus BA to decoder DEC, which then addresses the element in question by a signal transmitted over one of signal paths $CS_1$ to $CS_5$.

Access controller CAR is comprised of data path controller CCD, and storage memory controller CMS. Data path controller CCD, in the embodiment described here, includes an Am 79c82 made by AMD. It is connected by eight-bit wide link $L_1$ to element FORMAC of access device DAPR and is also connected to high-speed bus BDF. It is also connected to storage memory controller CMS.

During data transmission, data path controller CCD requests access to network RN. When this access is granted, it then connects memory MST to the network via device DAPR. In addition, this same controller CCD receives the FDDI frames coming from network RN via DAPR at eight bits in width over line $L_1$ and sends this data at thirty-two bits in width to storage memory MST via bus BDF. During transmission, controller CCD receives the frames over bus BDF coming from storage memory MST at thirty-two bits and sends them at eight bits over line $L_1$ to access device DAPR which transmits them into network RN. Controller CMS in the embodiment described herein is composed of an Am 79c81 made by AMD. Controller CMS is connected to control bus BC and to high-speed bus BDF. In addition, it is connected by four-bit link $L_2$ to address bus BA of controller CGT. Controller CMS is also connected to storage memory MST by a 16-bit address bus Ad, a read control line RD, a write control line WR, and a memory block selection line CS. It is also connected to controller CCD. This connection enables controller CCD to request access to high-speed bus BDF to immediately transfer frames coming from network RN which are stored in its internal memories when the memories are at the point of being filled.

Controller CMS generates access priorities for high-speed bus BDF, depending on the priority level which was indicated above, with the highest degree of priority being the path from network RN to storage memory MST. In addition, controller CMS organizes the transfer of control characters generated by microprocessor MP via bus BC, controller CCD, and high-speed bus BDF to storage memory MST. This transmission of control characters coming from microprocessor MP takes place under special instructions from the microprocessor.

Controller CMS controls access to various sectors of storage memory MST. To this end, it addresses through address bus Ad and line CS, the storage memory which makes it possible to transfer either the data or the control characters to the memory addresses defined by the bits transmitted by address bus Ad and line CS. The addressing of storage memory is accomplished in two stages, namely by the information passing through line CS which makes it possible to address one of the modules composing this memory (memory MST is composed of several identical modules with given capacity of, for example 64k bytes), in a first pass and in a second pass, to address a given sector of a given block by bits transmitted over address bus Ad. The commands for writing or reading to or from the memory are transmitted respectively on lines WR and RD.

Controller CMS also generates interrupts which microprocessor MP processes. Thus, for example, the controller detects the arrival of frames and any anomalies which may exist in the transmission of the frames such as incomplete frames and frames including errors. When these various events occur, the microprocessor intervenes by carrying out the corresponding operations for which programming is contained in the EPROM memory. Controller CMS is connected to address bus BA of microprocessor MP since each address which is transmitted to it by the microprocessor indicates that a given operation has to be performed on a given register which constitutes this controller. (The registers constituting the controller, as well as the addresses thereof, and the operations which they are capable of performing are listed in the technical bulletin relating to part Am79c81 mentioned above.)

Controller CMS has six DMA channels. Two channels are used, one for transmission and the other for reception, to transmit and receive the information from interface IHA to storage memory MST, with two other channels being reserved for carrying both the transmission and reception information between data path controller CCD and storage memory MST, in one direction as well as the other, and finally two channels for carrying the information from microprocessor MP to storage memory MST, passing through controller CMS, in both directions. These latter two DMA channels of controller CMS are used relatively little, while the first four are used continuously.

Storage memory MST is a high-speed "static" memory (RAM) with a very short access time, for example 45 nanoseconds. It is divided into two zones $Z_1$ and $Z_2$.

Zone $Z_1$ contains "chained" FDDI frames which are received from network RN. One part of zone $Z_2$ is preprogrammed and includes the specific frames which are sent on network RN when there are problems in it, as is the case for example if the token is lost or if the time required for the token to circulate is too long. In this case, those specific frames are resent into the network whose existence and format are provided and defined by the above ANSI standard. Zone $Z_2$ also contains FDDI frames which are formatted and "chained" ready for transmission over network RN.

In the present embodiment described herein, data interface IHAD is composed of two sets of four memories of the FIFO type (first in, first out) with relatively large size, one for transmission and the other for reception. Each of the four FIFO memories in a set can contain 2048 nine-bit words. These four FIFO's are mounted in parallel so that for example during transmission the first of them receives bits $HD_0$ to $HD_8$, the second receives bits $HD_9$ to $HD_{17}$, the third receives bits $HD_{18}$ to $HD_{26}$ and the fourth receives bits $HD_{27}$ to $HD_{31}$ as well as the four parity bits $HDP_0$ to $HDP_3$. A similar arrangement is used for the four FIFO's during reception.

The output bits for each of the FIFO memories are the following: $DB_0$ to $DB_8$ for the first memory, $DB_9$ to $DB_{17}$ for the second, $DB_{18}$ to $DB_{26}$ for the third, $DB_{27}$ to $DB_{31}$ and the four parity bits $DBP_0$ to $DBP_3$ for the fourth. It should be pointed out that the four memories, in the embodiment described here, are comprised of 67c4503-50 type modules made by AMD. All of these various modules are compatible in speed. In view of the fact that each of them can contain 2048 bytes, it will be apparent that interface IHAD could contain easily the entire contents of one FDDI frame, namely 4500 bytes.

These modules are designed to contain internal counters which determine the state of filling of the FIFO memories. When the FIFO memory is empty, its associated counter transmits a signal or a flag, EF. When the FIFO memory is half full the signal emitted by the counter is designated by HF. When the FIFO memory is full the signal which is emitted is designated FF. These three signals serve to regulate the transfer of information between host module HIO and adapter device DEA, knowing that each write operation in storage memory MST corresponds to a read operation in the FIFO memories at interface IHAD, and reading from this same storage memory corresponds to writing in the FIFO memories.

The following explains how the reading operation in the storage memories MST is performed. The control logic of channel DMA of controller CMS is controlled by signals FF and HF. If the contents of the FIFO memories are less than or equal to HF (FIFO memory half full), they are written into by accessing them in the burst mode. If the contents of the FIFO memory are between FF and HF, writing of the FIFO memory is by "cycle steal mode" (access in the "cycle theft" mode is twice as slow as access in the burst mode). If the contents of the FIFO are equal to FF, the transfer operations DMA under the control of controller CMS cease. When host module HIO has read memory FIFO, the latter being henceforth partly empty, channel DMA of CMS automatically returns to service until the end of the required transfer (complete transfer of one or more successive frames).

The following explains the write operation in storage memory MST. The command logic of DMA is controlled by signals EF and HF. If the contents of the FIFO memory are less than or equal to HF, reading FIFO takes place and access to memory MST takes place in the "cycle steal mode" mode. If the contents of the FIFO memory are greater than HF, memory FIFO is read and access to the storage memory is permitted according to the burst mode. Finally, if the contents of the FIFO memory are equal to EF, the DMA transfer is stopped. As soon as the contents of the FIFO memory are again less than EF, transfer DMA resumes until the end of the required transfer.

Control interface IHAC includes bidirectional FIFO memories which permit transfer of the various parameters required for forming the command characters of the FDDI frames, in both the transmission and reception directions. In the embodiment described herein, interface IHAC comprises two bidirectional FIFO modules, such as a 67c4701 type made by AMD.

Each bidirectional FIFO module comprises primarily two bidirectional FIFO memories containing 512 groups of nine bits (one byte plus one parity bit). These two bidirectional FIFO modules are designated respectively $BF_1$ and $BF_2$, FIG. 4. When the first microprocessor PROC wants to write to the two bidirectional FIFO memories, it sends a signal $W_1$ to each of them. A read signal $R_3$ is sent by second microprocessor MP when the latter wants to read what was written by the first microprocessor.

Figure 4:
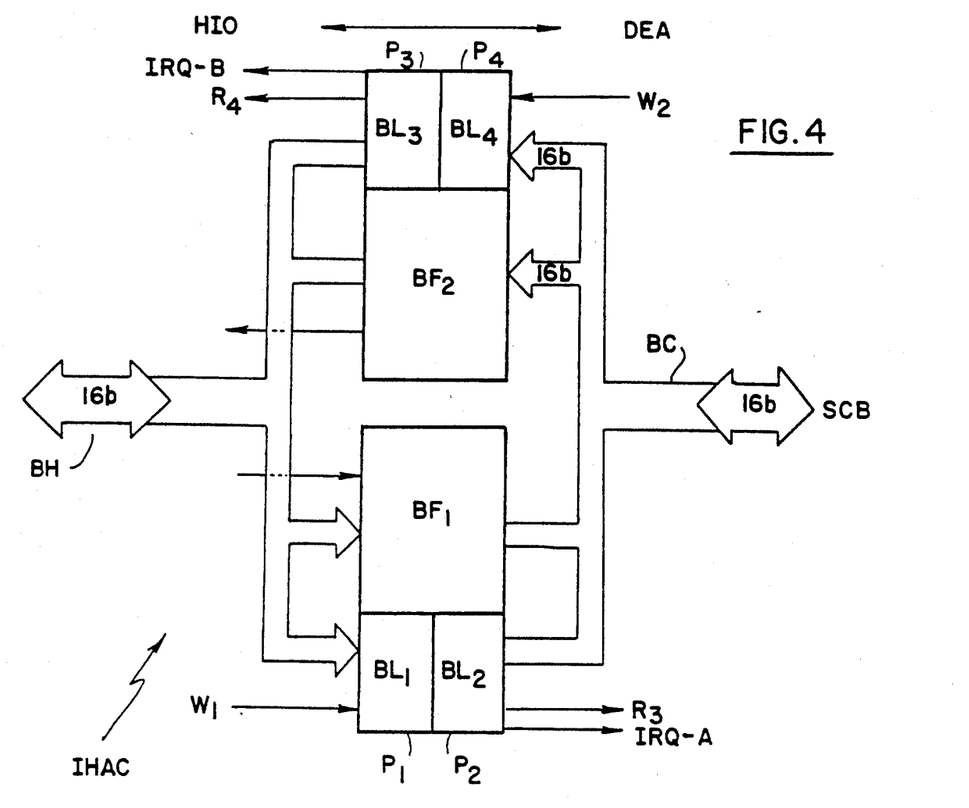
FIG. 4 shows the part of the transfer interface used to transfer the information contained in the control blocks to the control bus of the controller.

When second microprocessor MP wants to write to the two bidirectional FIFO memories, it sends a signal $W_2$ to each of them, which corresponds to a read signal $R_4$ sent by the first microprocessor PROC when the first microprocessor wants to read what was written by the second microprocessor.

Each bidirectional FIFO module has two ports, namely $P_1$ and $P_2$ for module $BF_1$ and $P_3$ and $P_4$ for module $BF_2$. It will be recalled that a port is an input port or an output port on a bus on the module in question. Thus, ports $P_1$ and $P_3$ are the input ports on bus BH while $P_2$ and $P_4$ are the output ports on control bus BC. Each port is associated with a mailbox or register. Thus ports $P_1$ to $P_4$ are respectively associated with mailboxes $BL_1$ to $BL_4$.

From the functional standpoint, we can consider that the combination of the two ports $P_1$ and $P_3$, and the combination of the two ports $P_2$ and $P_4$ constitute one and the same entity which is designated respectively by $P_{13}$ and $P_{24}$. The same is true for the mailboxes associated with them which are then designated respectively by $BL_{13}$ and $BL_{24}$. From a functional standpoint, each mailbox is associated either with the host module and more specifically its microprocessor PROC (box $BL_{13}$) or with the management controller CGT and more specifically microprocessor MP (box $BL_{24}$).

First microprocessor PROC can write or read its associated mailbox $BL_{13}$. The latter is therefore written to or read from under control of the first microprocessor. It can likewise be read from under control of second microprocessor MP. Similarly, second microprocessor MP can write or read its associated mailbox $BL_{24}$. The latter is therefore written to or read from under control of the second microprocessor. It can likewise be read from under control of first microprocessor PROC.

When the host system writes to its mailbox $BL_{13}$, interface IHAC sends to microprocessor MP an interrupt signal called IRQ-A. Similarly, when microprocessor MP writes to the mailbox of DEA ($BL_{24}$), interface IHAC sends an interrupt called IRQ-B to microprocessor PROC of the host module. Interrupts IRQ-A and IRQ-B regroup respectively all the interrupts coming from the host module and all the interrupts coming from microprocessor MP.

Figure 5:
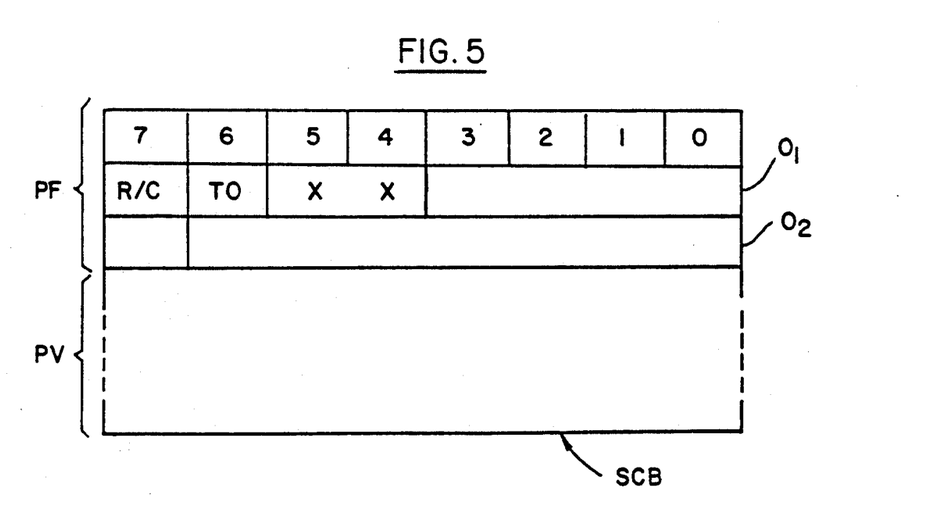
FIG. 5 shows the makeup of a control block containing parameters relative to the composition of FDDI frames.

Control block SCB, FIG. 5, is comprised of a fixed portion or part PF and a variable portion or part PV whose length is a function of each operation performed either by adapter device DEA or by host module HIO.

The fixed part PF includes two bytes designated by $O_1$ and $O_2$. First byte $O_1$ designates on its four LSB'S, the code of the operation to be accomplished while the two bits in bit position 4 and 5 permit designating a subfamily within certain given operations whose designation is accomplished on the four LSB's. Bit position 7, designated R/C for response/command, indicates whether the request which has been made is a command when the bit is equal to zero or a response when the bit is equal to 1.

Bit position 6 is provided to be used in the case when the adapter device is located inside a station or terminal other than computer ORD, such as a CRT terminal and where it is necessary to transmit a certain amount of information to this station (to display the results of statistics, the arrival of frames, etc.). If the bit is equal to zero, no information is transferred to the station (there is then only a transfer of information from DEA to the host or vice versa). If it is equal to 1, one can transfer the information to the station (while continuing to transfer the data from DEA to the host or vice versa). Byte $O_2$ indicates the size of control block SCB if the request is a command and a report if the request is a response. A report is provided by one of the two microprocessors PROC and MP in response to the command issued by the other of these two microprocessors, this report indicating that it is possible to perform the operation requested by the first of them. However, since the communication mode between the two microprocessors by command/response is very long (it is necessary to acknowledge a command while sending a response before launching the operation), it is preferable to operate in such fashion that the second microprocessor does not send a response to the command from the host and simply performs the operation corresponding to this command.

The variable part PV includes for example, the information required to form FDDI frames, in other words the control characters thereof, and all other information required for performing one of the operations which the adapter device DEA can perform under the control of controller CGT.

It is obvious that first byte $O_1$ of fixed part PF is transmitted from first module $BF_1$ while the second byte $O_2$ is simultaneously transmitted from module $BF_2$. The division of the bytes between these two modules is similar for the bytes in part PV.

The variable part PV of control block SCB is loaded into the bidirectional FIFO memory of each module while the fixed part PF is loaded into the mailbox. The transfer mode is as follows. When an interrupt IRQ-A or IRQ-B is generated, first a check is made to determine that it is not due to a parity error. The interrupt is approved unless it was generated by the mailbox. If there is no parity error, reading the mailbox which contains the fixed part of control block SCB automatically acknowledges the interrupt, and the transfer of the fixed part and the variable part of the control block can take place to either host module HIO or to microprocessor MP. Using the bidirectional FIFO modules makes it possible to chain control blocks SCB to each other, and thus to generate, starting in one or the other of the two microprocessors PROC and MP, queues of control blocks. It is therefore possible to transfer several control blocks SCB while transferring the data corresponding to one of them.

Figure 6:
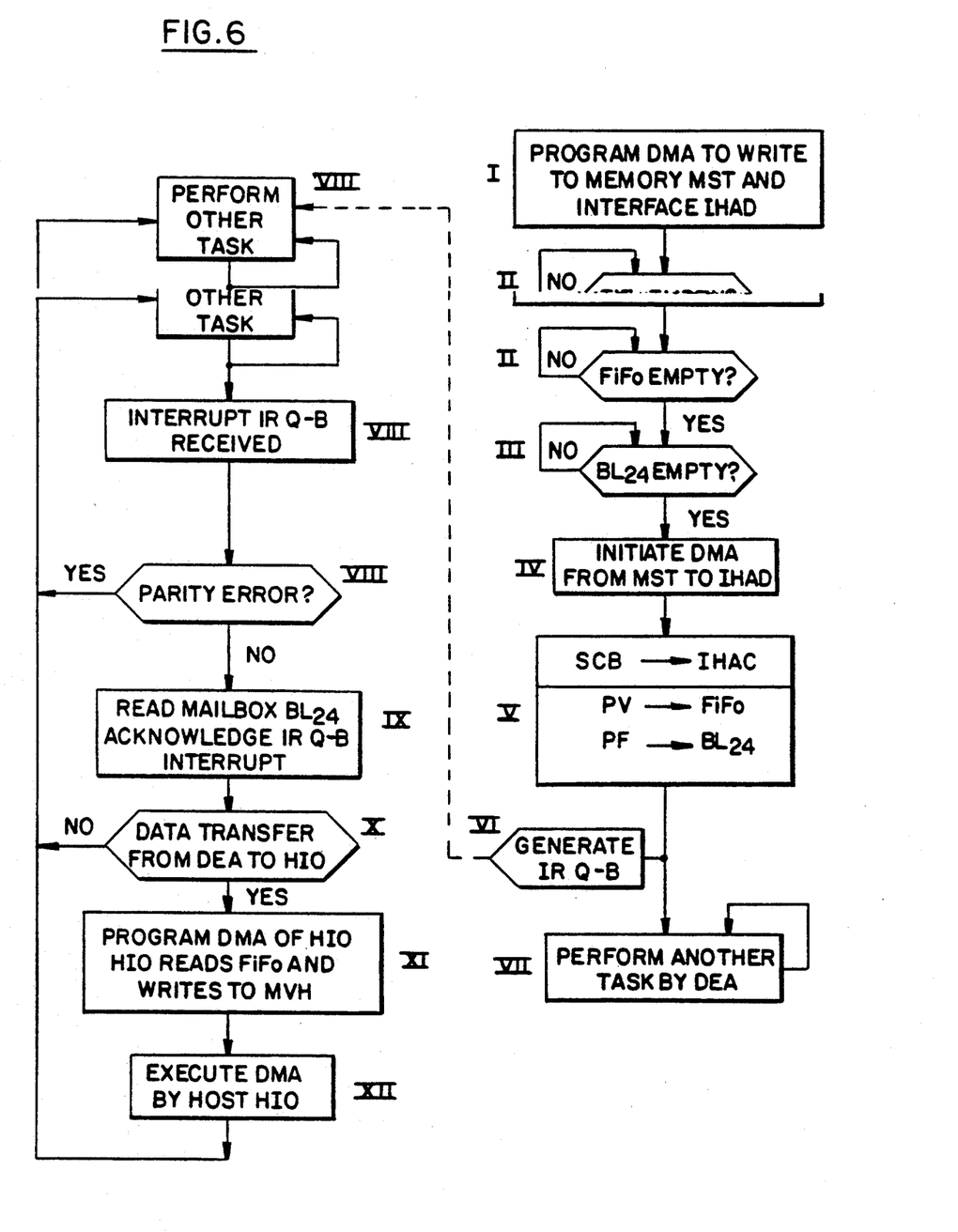
FIG. 6 shows a flow chart illustrating the functioning of the gateway device according to the present invention and showing how the network information is transferred to the host module.
Figure 7:
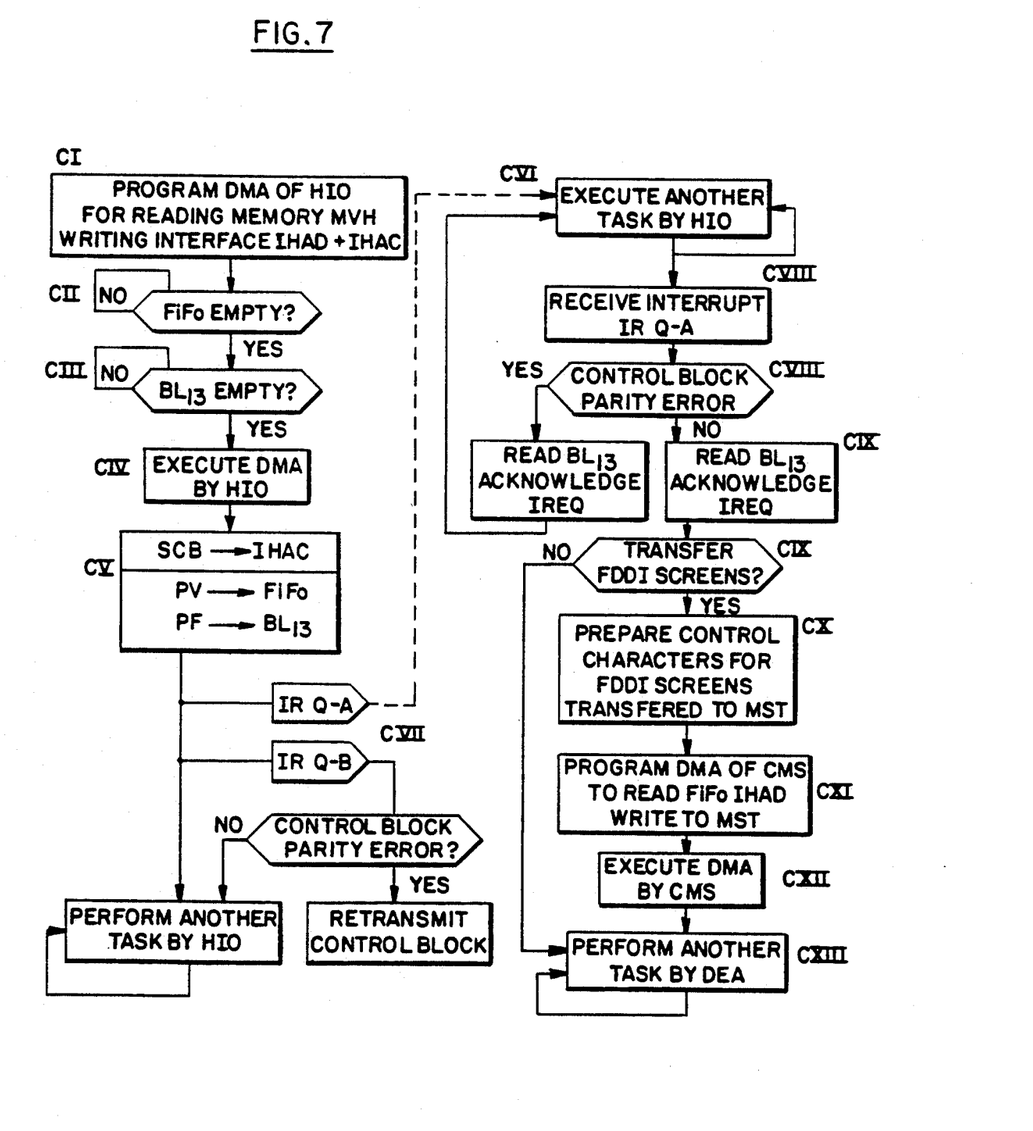
FIG. 7 shows a flow chart illustrating the function of the gateway device according to the present invention and showing how the information is transferred from the host module to the network.

The details of the operation of device DPC according to the invention will be apparent from FIGS. 6 and 7 which show respectively the various operations performed by the transfer program contained in the EPROM memory of controller CGT when transferring from adapter device DEA to host module HIO or in the memory MMP of module HIO when transferring from the host module to the adapter device.

The transfer program flow chart shown in FIG. 6 comprises twelve successive operations, numbered from I to XII. During operation I, the FDDI screen arrives from network RN. After being formatted, decoded, transferred in parallel at eight bits by element FORMAC and converted to thirty-two bits by data path controller CCD, this frame arrives in storage memory MST. The microprocessor, alerted by controller CMS that a frame has arrived in the storage memory, reads in it the control characters which are at the head (size of screen in bytes, source address, destination address, etc.) and uses these elements to form control block SCB, in order to transfer it to host module HIO. It then programs the DMA of controller CMS indicating the source address of the block to be transferred into the storage memory, and the size of the block to be transferred.

During operation II, the CMS controller first checks to see if the FIFO memories of interface IHAD are empty. If they are not, it repeats the operation until they are. If the FIFO memories of interface IHAD are empty, the process moves on to operation III.

During operation III, a check is made in the same way as in operation II to determine whether mailbox $BL_{24}$ is empty. If it is, the process moves on to operation IV in which controller CMS sends its DMA, in other words it initiates the transfer of data from storage memory MST into the FIFO memories of interface IHAD. Microprocessor MP is then free and can perform another operation during this period of time and the DMA of controller CMS acts alone. Operation IV is carried out at the same time as operation V.

During operation V, which is performed simultaneously with operation IV, microprocessor MP loads control block SCB into the two bidirectional FIFO memories $BF_1$ and $BF_2$, the fixed part being loaded into mailbox $BL_{24}$ while the variable part which contains the parameters defining the operation to be accomplished is transferred into the bidirectional FIFO memories proper. The procedure then moves on to operation VI in which writing the fixed part PF of control block SCB generates interrupt IRQ-B. This operation is automatic and internal to the bidirectional FIFO memory by design. One can then carry out operations VII and VIII simultaneously.

During operation VII, another task (another operation) is carried out by the adapter device under the control of controller CGT such as statistics, maintenance of the adapter device, formatting of control characters of a screen for transmission, processing a new frame which arrives at reception, and if there is nothing else to do, monitoring.

To perform operation VIII, host module HIO which was in the course of carrying out some task, interrupts the task and takes into account interrupt IRQ-B sent to it by interface IHAC. Microprocessor PROC determines if there is a parity error that occurred during transfer. If there was an error, it returns to operation VIII and during this time module HIO repeats the task which it had interrupted. If there is no parity error, everything moves on to operation IX in which mailbox $BL_{24}$ is read and interrupt IRQ-B is acknowledged. This means that the host module can effectively transfer information from interface HIA. It then moves on to operation X.

During operation X, a check is made as to whether the operation to be accomplished is a request to transfer data between adapter device DEA and host module HIO. If not, the host module performs another task, for example the one it interrupted. If so, however, it moves on to operation XI in which processor PROC programs its controller CDA and then moves onto operation XII.

To execute operation XII, microprocessor PROC launches its own DMA. If the data transfer operation from interface IHA to RAM memory MVH of module HIO is a priority task for the microprocessor, it is then executed by the host module. If the latter has a task with a higher priority, its own DMA is interrupted during execution of this task until it is completed, whereupon the DMA resumes execution of the data transfer at the point where it had been interrupted.

The operations shown in FIG. 7 facilitate comprehension of the functional details of data transfer from the host module to the adapter device. This program is contained in the MMP memory of the host module. This program essentially comprises thirteen major operations numbered CI to CXIII.

During operation CI, microprocessor PROC programs its DMA by reading memory MVH, and writing into the FIFO memories of interface IHA. The microprocessor indicates the originating address in its memory, and the size of the block to be transferred. It then moves on to operation CII during which the microprocessor PROC checks to determine whether the FIFO memories of interface IHAD are empty. If they are not it repeats the operation. If they are, it moves on to operation CIII.

During operation CIII, the microprocessor looks to see if mailbox $BL_{13}$ of interface IHAC is empty, similarly to operation CII. If it is, it moves on simultaneously to operations CIV and CV in which microprocessor PROC, operation CIV, launches the DMA, in other words it transfers the data to interface IHAD. During operation CV, control block SCB is loaded into the bidirectional FIFO memories of interface IHAC. Writing mailbox $BL_{13}$ generates an interrupt, IRQ-A or IRQ-B. In the case of interrupt IRQ-A it moves on to operation CVI, while in the case of interrupt IRQ-B, it moves on to operation CVII.

During operation CVI, interrupt IRQ-A is sent to microprocessor MP of adapter device DEA. During this time the host module can perform another task. If during the loading of the command block into interface IHAC, operation CVII, there is a parity error, interrupt IRQ-B is sent back to the host module, meaning: The control block which was loaded is not correct; rewrite it. Then the control block is sent again by processor PROC.

During operation CVIII, microprocessor MP takes into account interrupt IRQ-A and looks again to see if there is a parity error in control block SCB transmitted to it. If there is no parity error, it moves on to operation CIX. If there is a parity error, it acknowledges interrupt IRQ-A and microprocessor MP can return to another task. A determination is made during operation CIX as to what operation is to be performed. If this operation is not a data transfer to the storage memory, microprocessor MP moves on to another task as shown by operation CXIII. If this operation is a data transfer to the storage memory, it moves on to operation CX.

Microprocessor MP prepares, during operation CX, the control characters for the head and end of the FDDI frame to be constructed. When this work has been performed it moves on to operation CXI during which microprocessor MP programs the DMA of controller CMS. Once this has been done it moves on to operation CXII.

Microprocessor MP launches the DMA of controller CMS during operation CXII. It reads the data contained in the FIFO memories of interface IHA and writes in storage memory MST. During this time microprocessor MP is free and moves on to operation CXIII in which microprocessor MP performs another task. Such a task can be receiving another frame coming from network RN. In the storage memory, it is possible to have a transfer of frames coming from the network or from the host module. The two channels DMA of controller CMS, for transmission and reception, can share high-speed bus BDF, said bus having a throughput twice the throughput of the ring constituting network RN.

Other modifications will occur to those skilled in the art without departing from the spirit and the scope of the invention as claimed. Accordingly, the above description is not intended to limit the invention except as indicated in the following claims.

What is claimed is:

1. An adapter device having a plurality of interface ports coupled to a ring network, said adapter device comprising:
   a network access controller;
   a control bus coupled to said network access controller;
   a storage memory;
   a data bus coupled between the network access controller and the storage memory;
   an access device having a first port coupled to said network access controller, having a second port coupled to said control bus and having a plurality of opto-electric couplers with each of said plurality of opto-electric couplers corresponding to one of the plurality of interface ports of said adapter device and wherein first ones of said plurality of opto-electric couplers are for receiving data from the ring network coupled thereto and second ones of said plurality of opto-electric couplers are for transmitting data fed thereto to said ring network; and
   a transfer management controller coupled to said control bus for interpreting and transmitting frames to said access device and for receiving control blocks from said access device to form frame control characters, and for interpreting frame control characters to form control blocks, and for managing the transfer of data frames to said access device through the data bus, the storage memory, and the network access controller and for providing transfer of data and control blocks, corresponding to different frames on the data bus and the control bus, with such transfers capable of being performed independently and simultaneously.

2. The adapter device of claim 1 wherein said plurality of opto-electric couplers correspond to:
   a first pair of opto-electric couplers for transmitting and receiving, with a first one of said first pair of opto-electric couplers coupled to a first one of said plurality of interface ports of said adapter device and a second one of said first pair of opto-electric couplers coupled to a second one of said plurality of interface ports of said adapter device; and
   a second pair of opto-electric couplers for transmitting and receiving with a first one of said second pair of opto-electric couplers coupled to a third one of said plurality of interface ports of said adapter device and a second one of said second pair of opto-electric couplers coupled to a fourth one of said plurality of interface ports of the adapter device.

3. The adapter device of claim 2 wherein said transfer management controller comprises:
   a microprocessor coupled to said control bus;
   a transfer management control bus coupled to said microprocessor;
   at least one memory element coupled to said transfer management control bus and said control bus; and
   a decoder, coupled to said transfer management control bus, for addressing said microprocessor and the at least one memory element.

4. The adapter device of claim 3 wherein:
   said ring network comprises:

a first fiber optic ring network having at least one interface port of said adapter device coupled thereto; and a second fiber optic ring network having at least one interface port of said adapter device coupled thereto.

5. A gateway device, for coupling a computer bus to a ring network, said gateway device having a plurality of interface ports coupled to said ring network and said gateway device comprising:

a first control bus;

a data bus;

a transfer interface, coupled to said control bus and said data bus, for transmitting control blocks to the control bus and capable of simultaneously and independently transmitting data blocks to the data bus;

a network access controller, coupled to said control bus and said data bus, for selectively providing said transfer interface access to the data bus;

an access device, having a first port coupled to said network access controller having a second port coupled to said control bus and having a plurality of opto-electric couplers with each one of said opto-electric couplers coupled to a corresponding one of the interface ports of said gateway device and wherein said access device receives a message from said ring network and provides the message in a first format to said network access controller and said network access controller receives the message in the first format and provides said message to said data bus in a second format; and a transfer management controller, coupled to said control bus, for carrying control blocks coming from or going to the transfer interface and for interpreting and transmitting frames to the access device and for receiving control blocks from the access device to form frame control characters and for interpreting frame control characters to form control blocks, and for managing the transfer of data frames between the transfer interface and the access device.

6. The gateway device of claim 5 wherein:

said transfer interface comprises:

a control interface circuit coupled to said control bus; and a data interface circuit coupled to said data bus; said access controller comprises:

a data path controller coupled to said control bus and said data bus; and a storage memory controller coupled to said data path controller, said control bus and said data bus; and said transfer management controller comprises:

a first microprocessor coupled to said control bus;

a transfer management control bus coupled to said first microprocessor;

at least one memory element coupled to said transfer management control bus; and a decoder, coupled to said transfer management control bus for addressing said first microprocessor and the at least one memory element.

7. The gateway device of claim 6 wherein said plurality of opto-electric couplers correspond to:

a first pair of opto-electric couplers for transmitting and receiving with a first one of said first pair of opto-electric couplers coupled to a first one of said plurality of interface ports of said gateway device and a second one of said first pair of opto-electric couplers coupled to a second one of said plurality of interface ports of said gateway device; and a second pair of opto-electric couplers for transmitting and receiving with a first one of said second pair of opto-electric couplers coupled to a third one of said plurality of interface ports of said gateway device and a second one of said second pair of opto-electric couplers coupled to a fourth one of said plurality of interface ports of the adapter device.

8. A method for transferring information from a computer to a ring network, said method comprising the steps of:

programming a first microprocessor to send information to the ring network;

generating, by said first microprocessor, at least one control block;

verifying by said first microprocessor that a first interface and a first mail box contain no information;

transferring frame data from said first microprocessor to said first interface;

transferring the at least one control block from said first microprocessor to said first mail box;

generating and causing, in response to the transferring frame data step, a first one of:

(a) an interrupt to a second microprocessor; or (b) an interrupt to the first microprocessor if there is a parity error;

resending the control block from said first microprocessor if said generating step provides the interrupt to the first microprocessor;

verifying by said second microprocessor whether the operation to be performed and for which an interrupt was received in said transferring frame data step is a transfer to the ring network;

forming control characters in a transfer management controller;

sending said control characters from said transfer management controller to a storage memory; and transferring data by an access controller to transfer data by reading said first interface and writing said data in the storage memory before transferring said frame data and control block to the ring network.

* * * * *

UNITED STATES PATENT AND TRADEMARK OFFICE
CERTIFICATE OF CORRECTION

PATENT NO. : 5,237,659
DATED : August 17, 1993
INVENTOR(S) : Gilbert Takats

It is certified that error appears in the above-indentified patent and that said Letters Patent is hereby corrected as shown below:

Column 2, line 25, "characters the" should read --characters, the--.

Column 4, line 65, "ORD₁" should read --ORD--.

Column 5, line 59, "IHA" should read --IHAC--.

Column 6, line 17, "screens" should read --frames--.

Column 7, line 22, "FDDI Frame" should read --FDDI frame".

Column 7, line 52, "RAM, MVH," should read --RAM or MVH,--.

Column 10, line 46, "screen" should read --frame--.

Column 10, line 47, "screens" should read --frames--.

Column 13, line 24, "cycle theft" should read --cycle steal--.

Column 15, line 52, "screen" should read --frame--.

Signed and Sealed this

Fifth Day of July, 1994

Attest:

BRUCE LEHMAN

Attesting Officer

Commissioner of Patents and Trademarks